(12) United States Patent
Gronlund et al.

(10) Patent No.: US 8,783,630 B2
(45) Date of Patent: Jul. 22, 2014

(54) RISER CLAMP

(75) Inventors: Per Kristian Gronlund, Naersnestangen (NO); Carsten Haavardtun, Oslo (NO); Kjell Hagatun, Finstadjordet (NO); Helge Grande Urhamar, Oslo (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 13/254,975

(22) PCT Filed: Mar. 17, 2010

(86) PCT No.: PCT/NO2010/000101
§ 371 (c)(1),
(2), (4) Date: Sep. 6, 2011

(87) PCT Pub. No.: WO2010/107322
PCT Pub. Date: Sep. 23, 2010

(65) Prior Publication Data
US 2011/0316274 A1 Dec. 29, 2011

(30) Foreign Application Priority Data
Mar. 17, 2009 (NO) .................................. 20091125

(51) Int. Cl.
*F16L 3/22* (2006.01)
*F16L 3/10* (2006.01)
*F16L 3/08* (2006.01)
*F16L 3/233* (2006.01)

(52) U.S. Cl.
CPC ... *F16L 3/10* (2013.01); *F16L 3/08* (2013.01); *F16L 3/233* (2013.01)
USPC ....... 248/68.1; 248/74.1; 248/74.3; 248/74.4; 405/195

(58) Field of Classification Search
CPC ............... F16L 3/127; F16L 3/10; F16L 3/08; F16L 3/233
USPC ............... 405/195, 224.2, 171, 216; 166/367; 248/188.1, 68.1, 74.1, 74.3
See application file for complete search history.

(56) References Cited

U.S. PATENT DOCUMENTS 4,249,610 A * 2/1981 Loland .......................... 166/360
4,381,020 A * 4/1983 Daghe et al. .................... 138/99

(Continued)

FOREIGN PATENT DOCUMENTS

DE 19928379 A1 12/2000
EP 787938 A2 8/1997

OTHER PUBLICATIONS

Bäcknert/Ely, Christer, "International Search Report", for PCT/NO2010/000101, as mailed Jun. 8, 2010, 4 pages.

*Primary Examiner* — Amy Sterling
(74) *Attorney, Agent, or Firm* — Winstead PC

(57) ABSTRACT

A riser clamp (1) made up of several parts and designed to carry a plurality of fluid pipes (11) in parallel with and spaced apart from a surface coated steel riser (10) is shown. The riser (10) itself is designed to be deployed into the sea for communication between a well head at the seabed and a surface vessel. Each riser clamp (1) is designed for frictional, non rotatable fixation to the surface coated riser (10) and is provided with a plurality of pipe saddles (V) to carry the respective fluid pipes (11). The riser clamp (1) has an internal abutment surface (2) made of fiber reinforced composite material which is configured substantially complementary to and designed to bear against the external, surface coated surface of the riser (10). The riser clamp (1) is tightened by means of circumferentially acting tightening means.

19 Claims, 5 Drawing Sheets

(56) References Cited

U.S. PATENT DOCUMENTS

Figure 1:
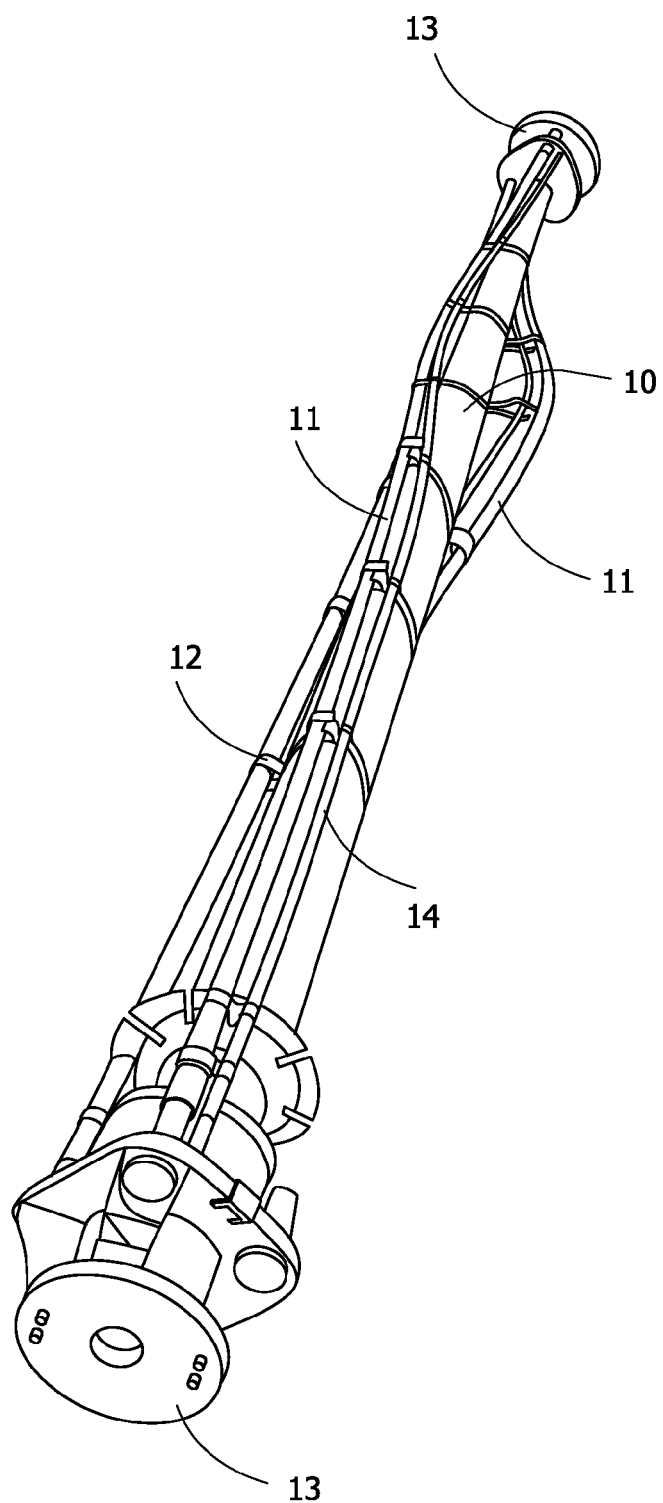

| | | | |
|---|---|---|---|
| 4,883,387 A * | 11/1989 | Myers et al. | 405/224.4 |
| 5,553,666 A | 9/1996 | Hartman | |
| 5,711,639 A * | 1/1998 | Tessier et al. | 405/171 |
| 6,290,195 B1 * | 9/2001 | Deuer | 248/230.8 |
| 6,601,852 B1 * | 8/2003 | Kogler et al. | 277/314 |
| 7,214,114 B2 * | 5/2007 | Gibson | 441/133 |
| 7,591,491 B2 * | 9/2009 | Lizenby et al. | 285/419 |
| 7,744,314 B2 * | 6/2010 | Eide | 405/224.2 |
| 7,749,035 B2 * | 7/2010 | Oram et al. | 441/133 |
| 2008/0251668 A1 | 10/2008 | Stokes | |
| 2009/0050330 A1 | 2/2009 | Papon et al. | |

* cited by examiner

RISER CLAMP

The present invention relates to a riser clamp made up of several parts and designed to carry a plurality of fluid pipes in parallel with and spaced apart from a surface coated steel riser, which riser is designed to be deployed into the sea for communication between a well head at the seabed and a surface vessel, said riser clamp being designed for frictional, non rotatable fixation to the surface coated riser and is further provided with a plurality of pipe saddles carrying the respective fluid pipes.

Such riser are typically used as drill pipe risers, i.e. to guide a drill string in a controllable way down through the riser, through a BOP and a Christmas three on the sea bed, and further down into the seabed formation to drill an oil or gas well.

The risers have in turn smaller steel pipes externally secured thereto. The steel pipes are of different dimensions and transport some kind of fluid in order to be able to perform certain functions on the Christmas three and the BOP on the sea bed. Normally the two largest pipes are "choke and kill" pipes. The kill pipe has as an object to be able to shut of a well in an emergency situation by activating a shear and shut off device. The choke pipe can be used to control/regulate the pressure within the well. In addition "booster pipes" and hydraulic pipes are present to operate valves and shut off rams.

The risers are normally assembled by pipe lengths of a certain extension, here for example in lengths of 22 meters. These are place against each other, end to end, by means of bayonet couplings which possess high integrity with regard to pressure and fluid leakage. These bayonet couplings, however, adds on, in some extent, in radial direction such that the smaller steel pipes need to be located at some distance from the surface of the riser. This is attended to by the pipe saddles that dictate the distance between the smaller steel pipes and the surface of the riser. A typical distance between the riser clamps in the longitudinal direction of the riser will be 2-3 meters.

The particular problem that arises in these smaller pipes is that they are exposed to motion by alternating pressure admission and pressure relief at pretty high pressures, such as 300 bars. During a pressure admission sequence this will create huge axial push forces that seek to enable buckling of the fluid pipes. This in spite of the very heavy walls of the smaller fluid pipes. As an example, a fluid pipe having an external diameter of 75 mm will have an internal diameter of 25 mm only. The phenomenon in turn creates enormous torsional forces to the riser clamps. The torque is amplified in that the pipe saddles are spaced apart from the surface of the riser.

It has been a problem with existing riser clamps made of steel that they are exposed for rotation about the riser and results in pointwise permanent deformation in the mentioned situations. See FIG. 1 that illustrates the phenomenon. It does not make it better that there exists a requirement to surface treatment of the risers, i.e. that they are coated with a corrosion protective layer such as epoxy, enamel or paint. Thus it is to be understood that it is important that holes are not made in said layer, either it had to take place during assembly or by mentioned rotation, such that sea water is admitted to the metal. In addition, such layer creates more surface smoothness, i.e. normally a lower friction coefficient between the riser clamp and the riser.

One main object with the present invention has been to find a solution that increases the friction between the riser clamp and the surface of the riser.

This is achieved by a riser clamp of the introductory said kind which is distinguished in that the riser clamp has an internal abutment surface made of fibre reinforced composite material which is configured substantially complementary to and designed to bear against the external, surface coated surface of the riser and that the riser clamp is tensioned by means of circumferentially acting tightening means. Thus it is to be understood that the composite material has a resin matrix which is that constituent of the composite material normally being in engagement with the surface of the riser, while the fibre armour is located immediately internal of the engagement surface.

It is assumed that the beneficial friction properties obtained partly is due to the E-module of the armoured or reinforced composite material which is in the order of magnitude 10 GPa (GigaPascal), while the E-module of steel is in the order of 210 GPa.

As known, the E-module tells something about the relationship between force and elongation in a material.

Another important presumption is the circumferentially acting tightening means. Confer separate theory discussion together with FIGS. 7 and 8.

In a first, more detailed embodiment the riser clamp is made up by a main part of metal and a base part of the fiber reinforced composite material, where the lower part provides a lining between the main part and the surface of the riser.

In a second and preferred embodiment, also with regard to weight reduction, the riser clamp is made up of a main part manufactured of fiber armoured composite material and a base part also made of fiber armoured composite material, which base part provides a lining between the main part and the surface of the riser. This embodiment is particularly suited when approaching deeper waters, when weight becomes a problem, without that this should be considered as a limitation.

Preferably said lining of the fiber armoured composite material can have a thickness in the order of magnitude 2-4 mm, preferably 3 mm.

In a third embodiment, each part of the riser clamp can be made of one and the same piece and precisely of the fiber armoured composite material. This means that it is omit the lining which would suffice in some situations.

It is further to be understood that the fiber armoured composite material can have fibres of one or more fiber materials chosen among; technical fiber/textiles such as carbon fiber, aramid fiber and glass fiber.

It is also to be understood that the fiber armoured composite material can have a resin matrix that may be chosen among; polymer like vinyl ester, polyester, epoxy, and thermo plastics.

The circumferentially acting tightening means of the riser clamp can be tensioning bands of suitable tensile strength that straps the clamp to the riser. The tensioning band can in turn include shackles with tightening screws. Such tensioning bands provide the favourable effect that the entire friction surface is taken in use and pointwise loads are avoided.

Conveniently the riser clamp has projecting flange portions that the circumferentially acting tensioning bands act against.

In a convenient embodiment the riser clamp can be made up by two halves placed against each other to enclose the riser.

In still another embodiment the two halves of the riser clamp can be hingedly connected to each other, for example in that the entire clamp is made in one piece, but with a weakening line at one spot such that this acts like a hinge point. Thus the clamp can still be opened, even if it is made in one piece when it is to be secured to a riser. Alternatively a hinge of per se commonly known type can be used in order to keep the parts together, and at the same time be able to be opened.

Also to be mentioned is that many different rubber materials as a liner have been tested in a traditional riser clamp of steel, without being able to achieve sufficient friction between the riser clamp and the surface of the riser.

Figure 2:
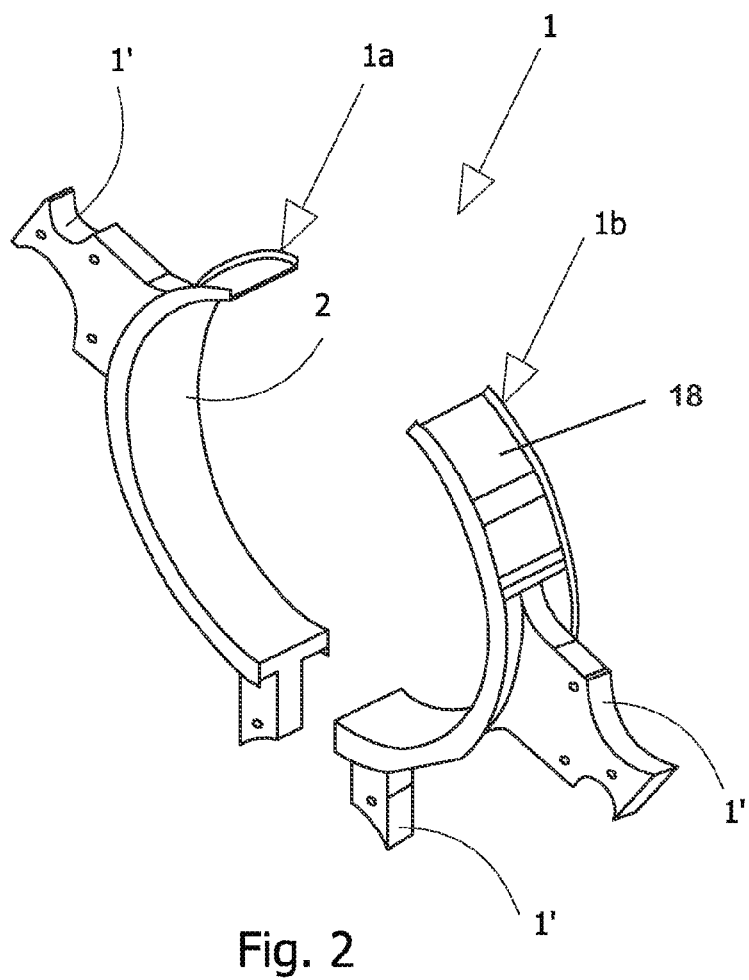
Figure 3:
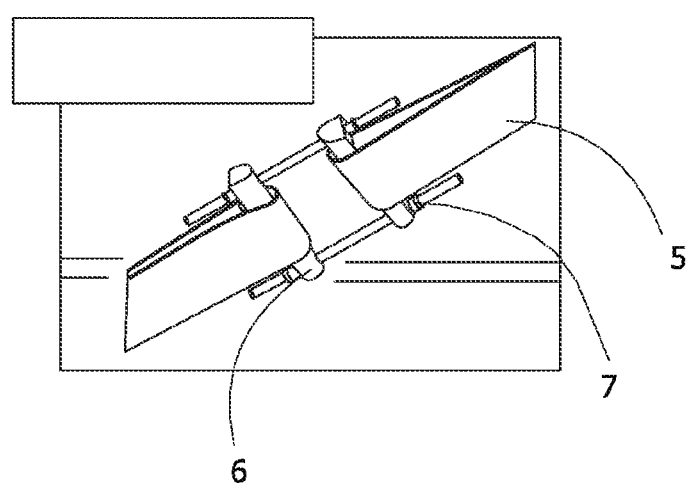
Figure 4:
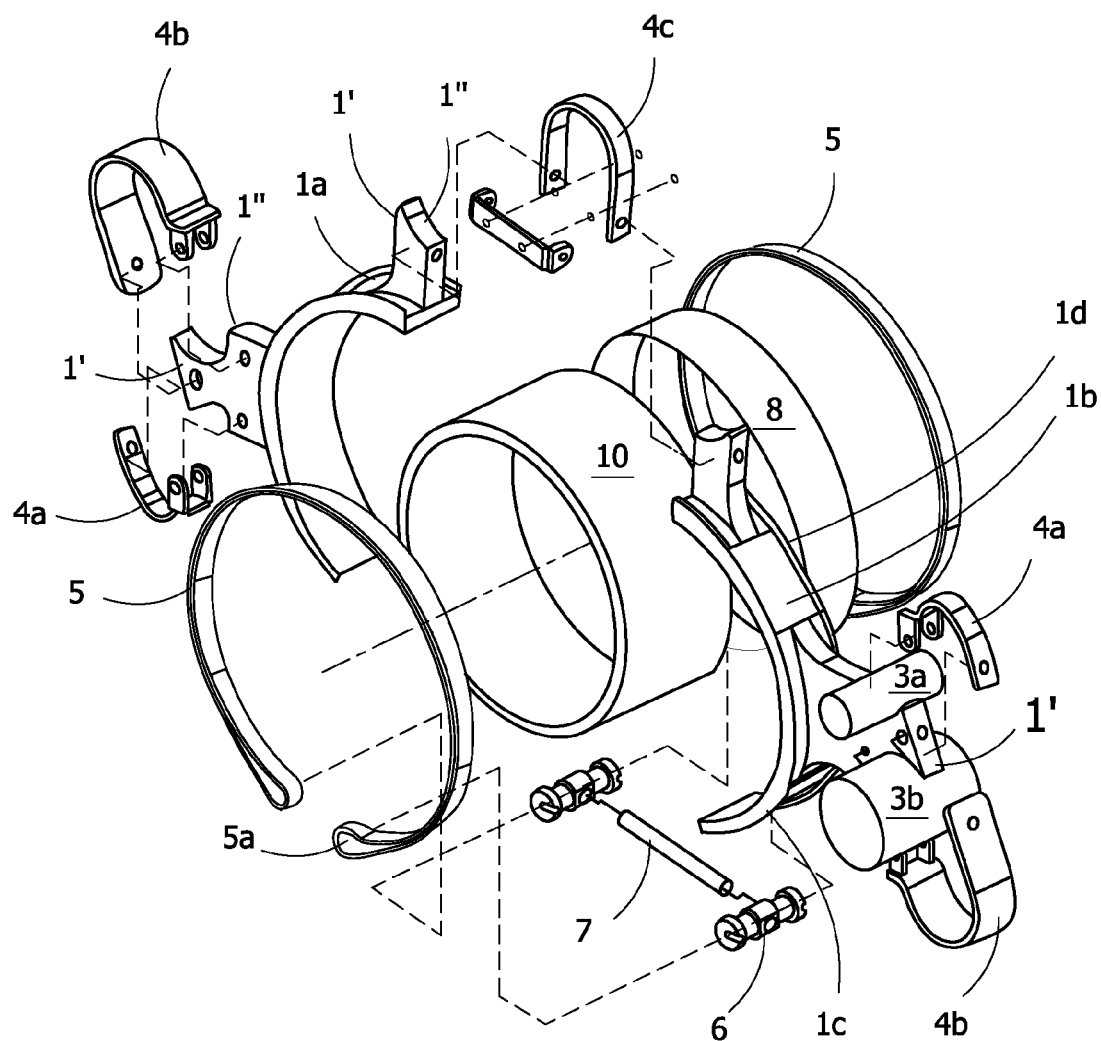
Figure 5:
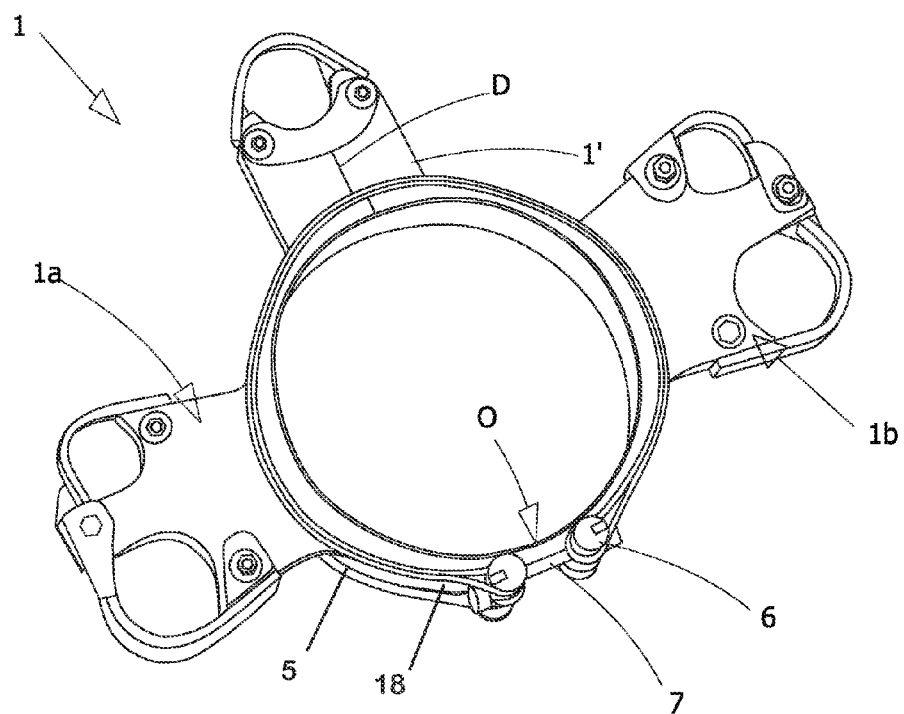
Figure 7:
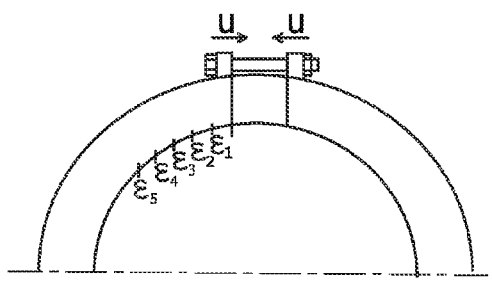
Figure 8:
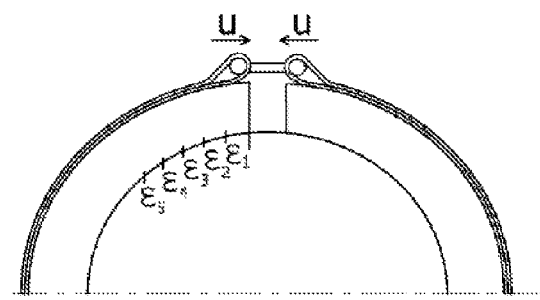
Figures 6A, 6B:
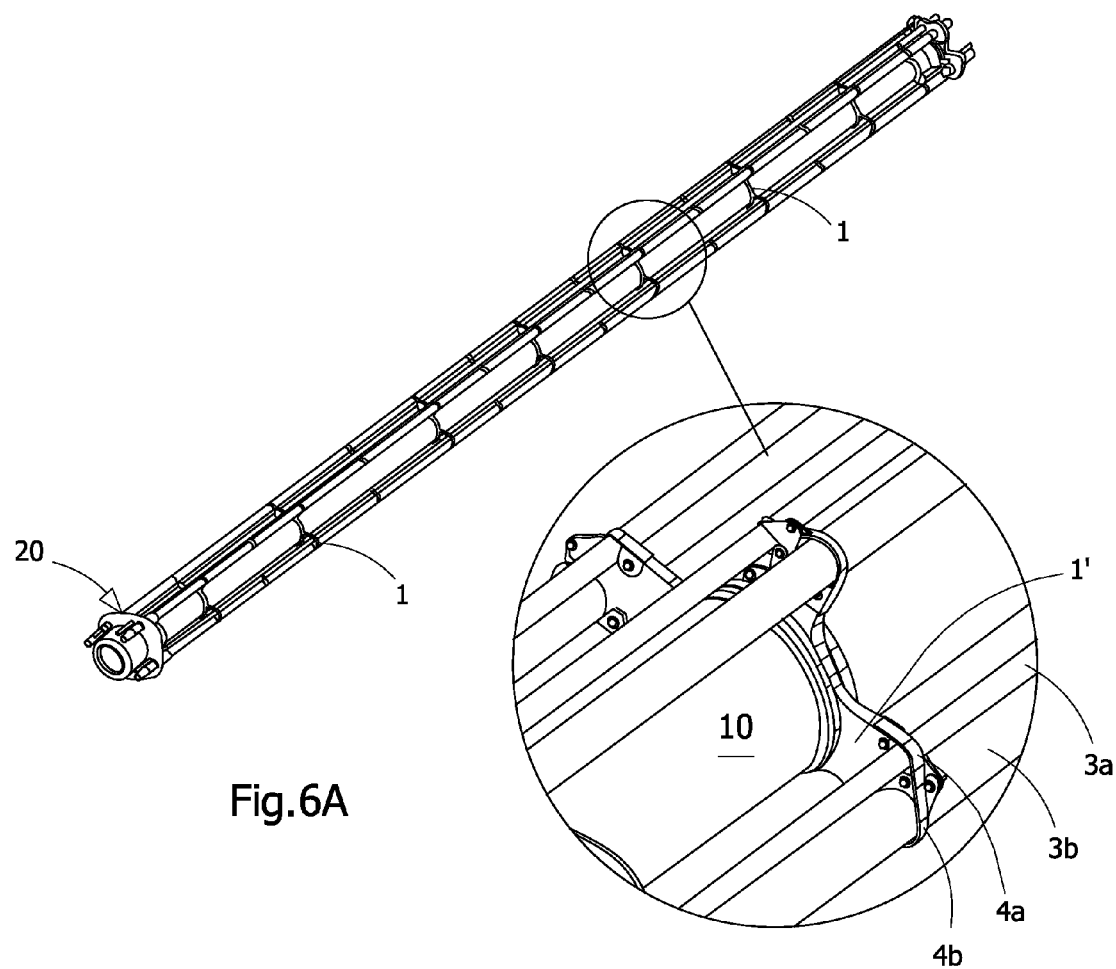

Other and further objects, features and advantages will appear from the following description of preferred embodiments of the invention, which are given for the purpose of description, and given in context with the appended drawings where:

FIG. 1 shows a damaged riser section that illuminates the problem according to the present invention, FIG. 2 shows a riser clamp in combination with a pipe saddle according to the invention, FIG. 3 shows a strap having tightening means for securing to the riser, FIG. 4 shows in perspective view and with the parts apart, a complete riser clamp with associated parts, FIG. 5 shows in perspective view a mounted riser clamp, FIG. 6A shows in perspective view a riser with mounted riser clamps according to the invention, FIG. 6B shows a detailed view of the encircled part of FIG. 6A, and FIGS. 7 and 8 show tightening with bolt clamp versus circumferentially acting clamp.

Reference is firstly made to FIG. 1 which makes the problem we are facing more clear. A central riser 10 is circumscribed by several smaller pipes, such as "choke and kill" pipes 11 of the introductory mentioned kind, and hydraulic pipes 14. Each riser section 10 has end fittings 13 such that a large number of pipe sections can be joined together in order to assemble a complete riser string. The end fittings 13 has in turn orienting means which results in that the smaller pipes 11, 14 are correctly assembled relative to each other when the pipe sections 10 are joined together.

The pipes 11, 14 are secured to the riser 10 by means of clamps 12, which traditionally has been made of regular steel of suitable grade. Such clamps 12 have in many situations proven inadequate in the sense that they have not been able to withstand or prevent buckling of the pipes 11, 14. Thus the clamps 12 have given in and rotated about the riser 10 and the result is like that illustrated on FIG. 1, and with hazard for later rupture.

FIG. 2 shows in perspective view a typical configuration of the main parts of the new combined riser clamp 1 and pipe saddle 1' according to the invention, where two halves 1a and 1b are placed against each other. The riser clamp 1 has an internal surface 2 which is particularly designed and calculated for frictional, rotationally rigid fixation to a riser 10. Risers of this type, here especially intended for drilling purposes, are to be deployed in the sea in order to connect a well head on the sea bed with a surface vessel. The risers 10 are surface coated, i.e. that they are coated with a corrosion protective layer such as enamel or paint.

The riser clamp 1 is provided with a plurality of pipe saddles 1' which are designed complementary to a pipe surface and are to support respective fluid pipes circumferentially and a distance apart from the riser 10. The internal abutment surface 2 of the riser clamp 1 is made of fiber armoured, or reinforced, composite material which in turn is intended to engage with the external surface of a riser 10, which is normally made of steel.

In a first embodiment (not shown) the riser clamp is assembled by a main part of steel and a secondary part made of the fiber armoured composite material. In this embodiment one may say that the secondary part constitutes a lining between the main part and the surface of the riser. The lining of the fiber armoured composite material is not very thick and will normally have a thickness in the order of magnitude of 2-4 mm.

In a second embodiment, as shown in FIG. 2, the riser clamp 1 is made in one and same piece of the fiber armoured composite material, preferably in a solid configuration. Examples of fibres in fiber armoured composite material can be any of several materials chosen among; carbon fiber, aramid fiber and glass fiber. The fibers are in turn embedded in a resin matrix chosen among vinyl ester, polyester and epoxy.

The fiber armoured composite material is constructed in layers, i.e. that the fiber reinforcement is located in layers in the matrix material. It is the fiber armouring which is the structural load carrier in the composite material. The individual fibers of the armour are gathered in "threads". The threads can in turn be kept together in that they appear in the form of a mesh or fabric. Typically all threads are laying in the plane and not with overlaying threads and underlying threads as in a weave. The threads can be oriented in a convenient way depending on which main directions the forces are acting. The treads can for example be oriented perpendicular to each other, or form an acute angle to each other. It is further to be understood that it is the matrix material in itself that engage with the riser, while the fiber armour is located immediately internal of the abutting surface. The distance between the abutting surface and the adjacent embedded layer of fiber armour fabric is determined based on each individual application.

To possibly further increase the grip, the engagement surface can have a predetermined texture, i.e. kind of a pattern, random or repetitive. One may have contemplated that already during the moulding operation a weave is laid down into the mould which at one side is to form an interface with the matrix material. This weave can also act as a transportation protection to be torn off when the riser clamp is to be mounted, such that the weave in the meantime is kept clean and free of dirt, in addition to counteract possible transportation damages.

As illustrated on FIG. 3 the riser clamp 1 is in turn strapped to the riser 10 by means of a tensioning band 5 of suitable tensile strength. The tensioning band 5 includes shackles 6 having tightening screws 7. In order to avoid circumferential elongation in the clamp 1, sliding agent such as grease can be applied between the tensioning band 5 and the clamp 1. Thus it will be consolidated that relative motion during the tensioning operation takes place between the tensioning band 5 and the externally facing surface 18 (FIGS. 2, 5) of the clamp 1 and not at the interface with the riser 10.

FIG. 4 shows again the riser clamp 1, now with the associated parts that complete the clamp. The riser clamp 1 is as before made up by two halves 1a and 1b which include respective pipe saddles 1'. The riser clamp 1 encircles the riser 10 which, for illustration purposes, is here shown only a short length of. On the one side of the riser clamp 1 pipes 3a, 3b of larger and smaller diameter are illustrated, such as "choke and kill" pipes and hydraulic pipes as previously described. They are brought to abutment in their respective saddle recesses 1" and can be secured in place by means of respective clamps 4a, 4b, 4c. The clamps 4a, 4b, 4c can both be hinged and fixed by means of bolts and nuts (shown on FIG. 5). The bolts are intended to pass through the illustrated holes in the pipe saddles 1' and the clamps 4a, 4b, 4c. In the illustrated embodiment five saddle recesses 1" are arranged in total which accordingly are able to support five pipes. The radius of curvature of the saddle recesses 1" is adapted to the diameter of the pipes to be located therein.

A shim or lining 8 is illustrated and can in some variants be included, but is not to be considered as mandatory. The lining 8 is made of fiber armoured, or fiber reinforced, composite material. If the riser clamp 1 is made of metal, such as aluminium, aluminium alloy, titan or steel, the lining 8 is mandatory. If the riser clamp 1 is made of fiber armoured composite material only, it is possible with one variant that have the lining 8 and one variant that is omit the lining 8. The thickness of the lining 8 will typically be in the order of magnitude 2-4 mm, without that the quoted dimensions shall be considered as a limitation of the invention.

As previously indicated each riser clamp 1 is in turn strapped to the riser 10 by means of tensioning bands 5 of suitable tensile strength. Here two tensioning bands 5 are shown which are designed for location on each side of the pipe saddle 1' when viewed in the longitudinal direction of the riser 10. As one can see from the figure, the clamping parts 1a, 1b have respective radially outwards extending flanges 1c, 1d that assist in keeping the tensioning bands 5 in place on the riser clamp 1, i.e. between a flange 1c, 1d and the pipe saddles 1'. The tensioning bands 5 include shackles 6 with a tightening screw 7. Each shackle 6 extends through a loop 5a in the tensioning band 5 and the one tightening screw 7 is centrally arranged and contributes to balance the forces acting within the two tensioning bands 5.

FIG. 5 shows a completely assembled riser clamp 1. The two clamping parts 1a, 1b are placed against each other and have their partition line D radially directed and extending midway through the pipe saddle 1' which is designed to support one single pipe only. The riser clamp 1 can either be parted or be hingedly connected in the area O adjacent to the shackle parts 6,7. The remaining construction is as described with regard to FIG. 4 and will not be repeated here.

FIG. 6A shows a finished assembled riser 20 having a number of mounted riser clamps 1 according to the invention. The riser clamps 1 support choke and kill pipes and hydraulic pipes in accordance with each individual contemplated application. It is to be mentioned that it is a very demanding exercise to secure the clamps 1 such that the saddles are laying fully aligned such that each individual pipe extends as rectilinear as practically possible.

FIG. 6B shows in enlarged scale the encircled part of FIG. 6A. The central riser 10 is shown and to which the riser clamps 1 are secured. The figures shows in closer detail how both a coarser choke and kill pipe 3b and a thinner hydraulic pipe 3a are supported by a pipe saddle 1' and how they in turn are secured in position by means of the clamp parts 4a, 4b. In this embodiment it is shown how three coarser pipes and three thinner pipes are supported by the riser clamps 1. The tensioning bands 5 are as shown in FIG. 4.

In connection with FIGS. 7 and 8 a theory will now be described about the circumferentially acting tightening means. What we seek to avoid is that a relative motion takes place between the contact surfaces when the tensioning takes place. When tightening a clamping mechanism around a circular object, the tension will elongate whatever object being tightened. The friction between the two objects will try to prevent this elongation. The result of the tension will be a friction force between the object and a normal force perpendicular to the surfaces acting between the clamping object and the circular object. During tensioning the friction force is not desired since it disrupts the process, but after tightening is complete the friction is desired to hold the parts in place.

See illustration in FIG. 7 that shows what is taking place in a common clamp bolt solution. The tension is applied by the movement U towards each other. The friction between the circular object and the fastening clamp will try to prevent the movement creating a drop in elongation in the clamp. From this the current follows:

$$e_1 > e_2 > e_3 > e_4 > e_5$$

This is undesirable due to loss of control of the tension. The desired elongation would be an even distribution of the elongation for maximum control $$e_1 = e_2 = e_3 = e_4 = e_5 = k$$

By removing the tension from the clamping object to a third object, e.g. an orbital strap, all tensional force can be transferred into the circular object as a normal force and not a friction shear force between the objects. This is done by creating a high friction interface between the clamping object and the pipe object, while reducing the friction in the interface between the clamped object and the object being tensioned.

See FIG. 8 that illustrates this by a circumferentially acting strap. By tensioning with a third object, $e_1$ to $e_5$ becomes zero between the clamping object and the circular object since there is no elongation in the clamping object.

All elongation is transferred to the designated tensioning object with a low friction (for example grease) between the tensioning object and the clamping object where the following relation exist:

$$e_1 > e_2 > e_3 > e_4 > e_{5 \to l\, e1} = e_2 = e_3 = e_4 = e_5 = k \text{ as the friction coefficient } \mu \to 0$$

This means that the tensioning becomes more ideal when reducing the friction coefficient between the tension object and the clamping object, without reducing the functionality of the clamping object which may have a high coefficient of friction against the circular object.

The invention claimed is:

1. A riser clamp to carry fluid pipes in parallel with and spaced apart from an external surface coated steel riser providing communication between a well head at a seabed and a surface vessel, the riser clamp comprising:
    a pair of halves for frictional, non-rotatable fixation to the external surface coated steel riser;
    the pair of halves having an external facing surface and an internal abutment surface made of a fiber reinforced composite material to circumferentially bear against the external surface coated steel riser;
    the pair of halves having radially outward projecting first and second flanges;
    a pipe saddle located between the first and second flanges and extending radially outward from the external facing surface to a first saddle recess to carry a first fluid pipe spaced radially apart from the external surface coated steel riser;
    a first clamp connected with the pipe saddle to secure the first fluid pipe in the first saddle recess; and
    an orbital strap to be positioned circumferentially about the pair of halves and located on the external facing surface between the pipe saddle and one of the first flange and the second flange, the orbital strap to circumferentially act on the pair of halves and thereby non-rotatably fix the pair of havles to the extenral surface coated steel riser in response to tensioning the orbital strap.

2. A riser clamp according to claim 1, wherein the pair of halves are metal.

3. A riser clamp according to claim 1, wherein the pair of halves are manufactured of fiber reinforced composite material.

4. A riser clamp according to claim 1, wherein the internal abutment surface is formed by a lining of the fiber reinforced composite material having a thickness in the order of magnitude 2-4 mm.

5. A riser clamp according to claim 1, wherein the fiber reinforced composite material has fibers of one or more fiber materials chosen among, carbon fiber, aramid fiber and glass fiber.

6. A riser clamp according to claim 1, wherein the fiber reinforced composite material has a resin matrix chosen among; vinyl ester, polyester and epoxy.

7. A riser clamp according to claim 1, wherein the orbital strap comprises shackles having tightening screws.

8. A riser clamp according to claim 1, wherein the internal surface of the riser clamp has a texture, random or repetitive.

9. The apparatus of claim 1, further comprising:
a second saddle recess formed on the pipe saddle to carry a second fluid pipe spaced radially apart from the externally facing surface and the riser; and
a second clamp connected with the pipe saddle to secure the second fluid pipe in the second saddle recess.

10. An apparatus, comprising:
a riser for providing fluid communication between a well head at a seabed and a surface vessel;
a riser clamp having an internal surface circumferentially engaging the riser, an external facing surface, and a pair of radially outward projecting flanges;
a pipe saddle located between the radially outward projecting flanges and extending radially outward from the external facing surface, the pipe saddle having a first saddle recess spaced radially apart from the external facing surface and the riser;
a first pipe extending parallel with the riser and abutting the first saddle recess;
a first clamp securing the first pipe in the first saddle recess; and
a tensioned band positioned circumferentially about the riser clamp and located on the external facing surface between the pipe saddle and one of the radially outward projecting flanges, whereby the tensioned band is circumferentially acting on the riser clamp to non-rotatably fix the riser clamp and the first pipe to the riser.

11. The apparatus of claim 10, wherein an interface between the internal surface and the riser has a friction coefficient greater than a friction coefficient of an interface between the tensioned band and the riser clamp.

12. The apparatus of claim 10, wherein the internal surface is made of a fiber reinforced composite material.

13. The apparatus of claim 10, further comprising:
a second saddle recess formed on an opposite side of the pipe saddle from the first saddle recess;
a second pipe extending parallel with the riser and abutting the second saddle recess; and
a second clamp securing the second pipe in the second saddle recess.

14. The apparatus of claim 13, wherein an interface between the internal surface and the riser has a friction coefficient greater than a friction coefficient of an interface between the tensioned band and the riser clamp.

15. The apparatus of claim 14, wherein the first saddle recess has a radius of curvature different from a radius of curvature of the second saddle recess.

16. An apparatus, comprising:
a riser clamp non-rotatably fixed to an external coated surface of a riser, the riser clamp having an internal surface substantially circumferentially engaging the external coated surface of the riser, an external facing surface, and a first flange and a second flange spaced apart and extending radially outward;
a first pipe saddle extending radially outward from the external facing surface, the first pipe saddle having a first saddle recess spaced radially apart from the external facing surface and the riser;
a first pipe extending parallel with the riser and abutting the first saddle recess; and
an orbital strap positioned circumferentially about the riser clamp and located on the external facing surface between the first pipe saddle and one of the first flange and the second flange, the orbital strap tensioned to secure the riser clamp to the riser, wherein an interface between the riser clamp and the orbital strap has a lower friction coefficient than an interface between the internal surface of the riser clamp and the riser.

17. The apparatus of claim 16, further comprising:
a first clamp hingedly connected to the first pipe saddle and securing the first pipe in the first saddle recess;
a second pipe saddle extending outward from the external facing surface of the riser clamp, the second pipe saddle comprising a second saddle recess spaced apart from the riser and a third saddle recess spaced apart from the riser and located on an opposite side of the second pipe saddle from the second saddle recess;
a second pipe extending parallel with the riser and abutting the second saddle recess;
a second clamp hingedly connected to the second pipe saddle and securing the second pipe in the second saddle recess;
a third pipe extending parallel with the riser and abutting the third saddle recess; and
a third clamp hingedly connected to the second pipe saddle and securing the third pipe in the third saddle recess.

18. The apparatus of claim 16, wherein the orbital strap comprises two tensioning bands that are positioned on the external facing surface on opposite sides of the pipe saddle from one another.

19. The riser clamp of claim 1, wherein the orbital strap comprises two tensioning bands that are positioned on the external facing surface on opposite sides of the pipe saddle from one another.

* * * * *